Figure 1:
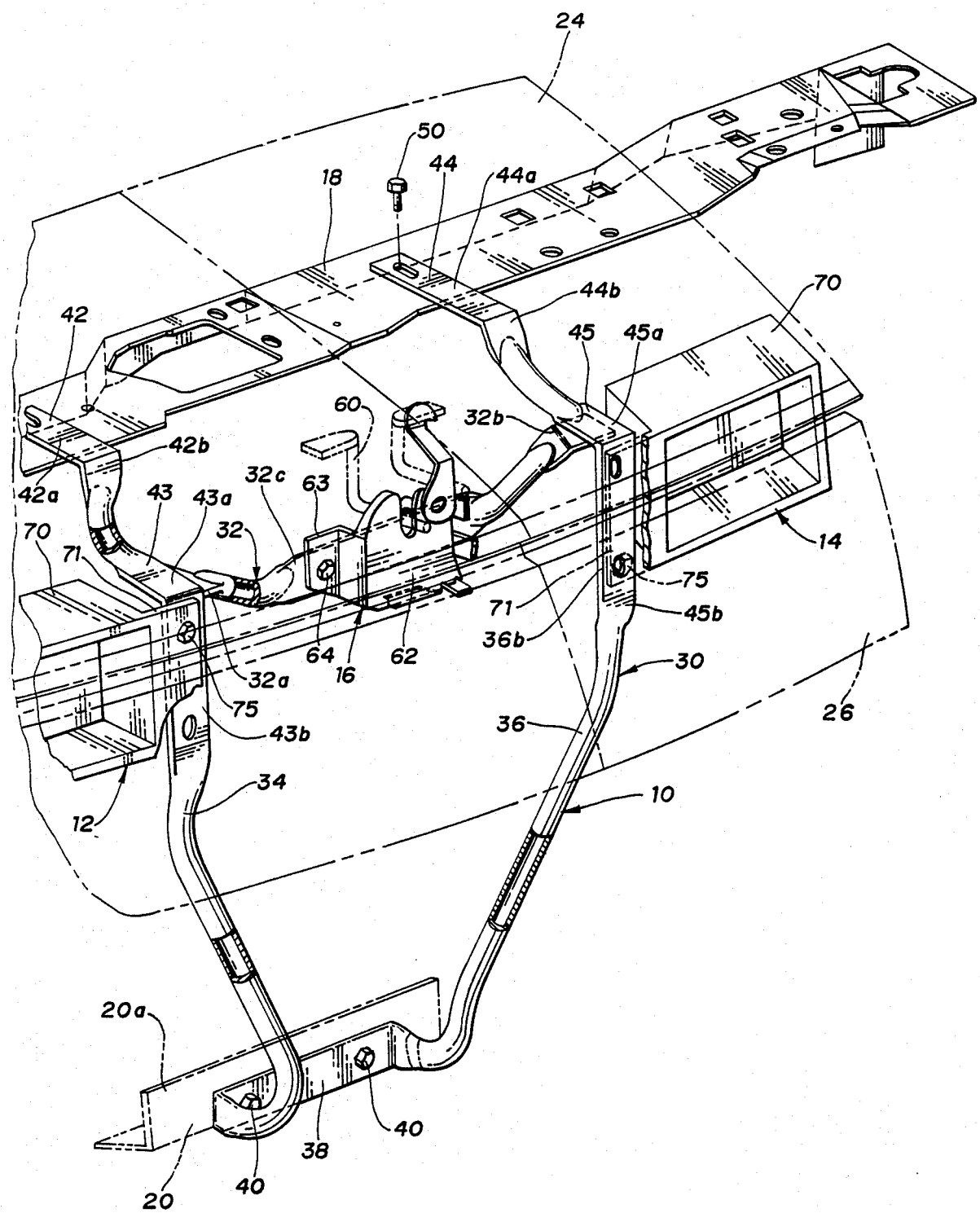

United States Patent [19]

Funkey

[11] Patent Number: 4,829,409
[45] Date of Patent: May 9, 1989

[54] TUBULAR STRUCTURE HOOD LATCH AND HEADLAMP MOUNTING FRAME

[75] Inventor: Donald J. Funkey, Ionia, Mich.

[73] Assignee: General Motors Corporation, Detroit, Mich.

[21] Appl. No.: 214,718

[22] Filed: Jul. 5, 1988

[51] Int. Cl.⁴ .......................... F21V 21/00; B60Q 1/04
[52] U.S. Cl. ...................................... 362/80; 362/382;
  296/194; 180/69.21; 292/DIG. 14
[58] Field of Search ...................... 296/194; 180/69.21,
  180/68.6; 292/1, DIG. 4; 362/61, 80, 382

[56] References Cited

U.S. PATENT DOCUMENTS

| | | | |
|---|---|---|---|
| 3,295,627 | 1/1967 | Fleck et al. | 296/194 X |
| 4,186,476 | 2/1980 | Mair et al. | 180/69.21 X |
| 4,532,578 | 7/1985 | Gaden et al. | 362/80 X |

FOREIGN PATENT DOCUMENTS 2576575 8/1986 France ................................. 362/80
982433 2/1965 United Kingdom ....... 292/DIG. 14

Primary Examiner—Ira S. Lazarus
Assistant Examiner—P. Neils
Attorney, Agent, or Firm—William A. Schuetz

[57] ABSTRACT

A two piece tubular front end support structure which is adapted to be readily attached to the upper and lower tie bars of a vehicle frame means. The two piece support structures comprises a generally U-shaped support member having a pair of horizontally spaced legs to which a pair of headlamp assemblies are respectively secured and a cross brace member welded to the legs of the main member and to which a hood latch assembly is adapted to be secured.

7 Claims, 2 Drawing Sheets

TUBULAR STRUCTURE HOOD LATCH AND HEADLAMP MOUNTING FRAME

The present invention relates to a support structure or frame for a front end of an automotive vehicle and, more particularly, to a two part support structure which can be readily attached to an upper tie bar and a lower tie bar of the vehicle frame means for supporting a pair of headlamp assemblies and a hood latch assembly.

Automotive vehicles traditionally are provided with front end frame work connected to a vehicle frame means. The frame work includes upper and lower tie bars extending laterally across the vehicle. This frame work additionally includes multiple welded-in-place support braces, brackets or other sheet metal parts for supporting such items as the radiator, headlamp assemblies, hood latch assemblies, etc. which are mounted thereto.

In accordance with the provisions of the present invention, a novel two piece front end support structure or frame is provided which can be readily attached to both an upper and lower tie bar of a vehicle frame means at the front end of the vehicle and which functions to support the left and right head lamp assemblies and a hood latch assembly.

Accordingly, an important object of the present invention is to provide a new and improved front end support structure or frame for a vehicle which can be readily attached to the upper and lower tie bars of the vehicle frame means and which will support both the left and right headlamp assemblies and hood latch assembly, and which is of a simple, strong and economical two piece tubular construction.

Another object of the present invention is to provide a new and improved vehicle front end support structure or frame, as defined in the preceding object, and in which the front end support structure includes a generally U-shaped tubular one piece main metal support frame defining first and second spaced legs and a lower intermediate bight portion and with the legs at their upper free ends being adapted to be secured to the upper tie bar of the vehicle frame means and with the bight portion being adapted to be secured to the lower tie bar of the vehicle frame means, and in which the first and second legs respectively support first and second headlamp assemblies secured thereto and extending laterally outwardly therefrom, and in which the support structure also includes a one piece tubular cross brace secured to the first and second legs and extending cross wise therebetween for supporting a hood latch assembly thereon whereby said front end support structure provides the sole support for the first and second headlamp assemblies and the hood latch assembly.

Yet another object of the present invention is to provide a new and improved front end support structure, as defined in the next preceding object, and in which the tubular support structure has flattened sections or areas to enable it to be readily attached to the upper and lower tie bars and to enable it to be readily attached to the first and second headlamp assemblies and the hood latch assembly.

Figure 2:
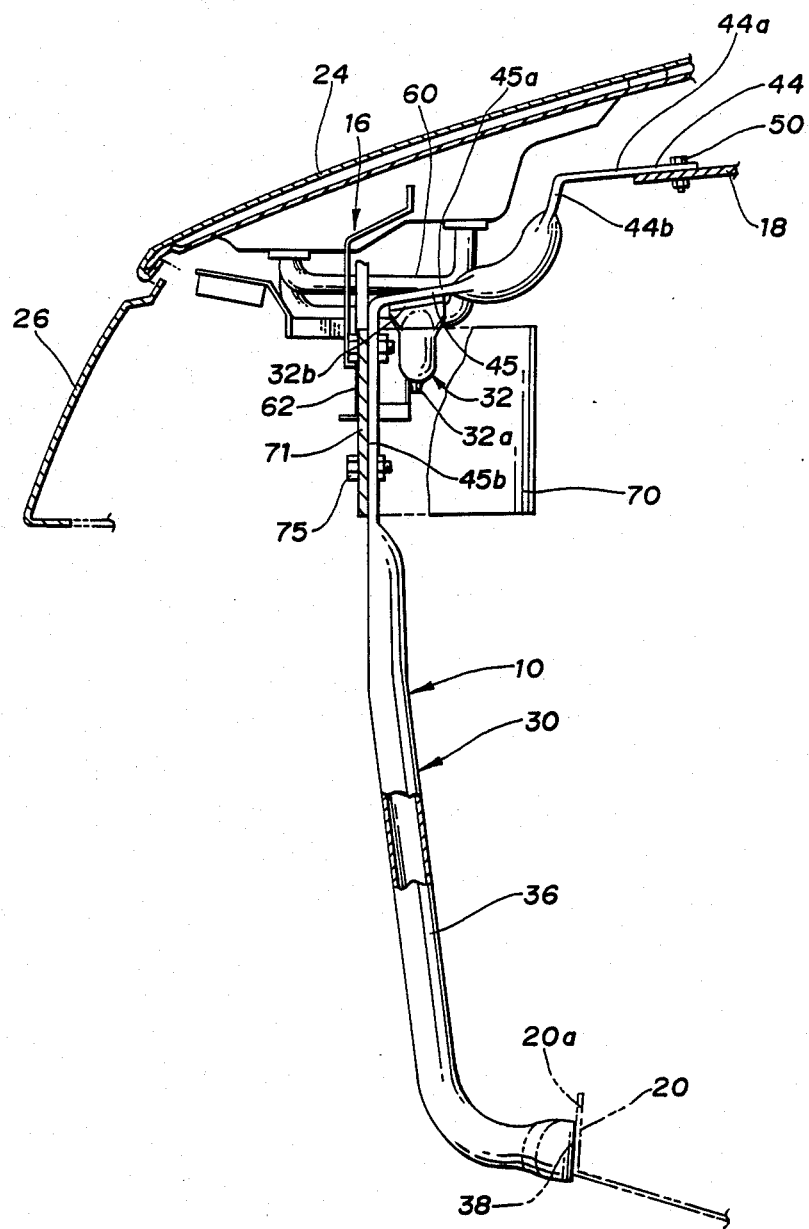

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

FIG. 1 is a fragmentary perspective view, with parts shown in section, of the novel vehicle front end support structure of the present invention and with the vehicle hood and front fascia being shown in phantom; and FIG. 2 is a side elevation view of the novel front end support structure of the present invention and showing the same in relation to the vehicle hood and front fascia, which is shown in section.

The present invention provides a novel vehicle front end support structure or frame 10 for supporting a first or left side headlamp assembly 12, a second or right headlamp assembly 14 and for supporting a hood latch assembly 16. The front end support structure 10 is adapted to be secured to an upper tie bar 18 and a lower tie bar 20 of a vehicle frame means. The vehicle frame means could be of any suitable or conventional construction and would include the upper tie bar 18 and the lower tie bar 20 which extend cross wise or laterally between the sides of the vehicle. Since the frame means could be of any suitable or conventional construction, it, except for the upper and lower tie bars 18 and 20, respectively, is not shown in the drawings. Likewise the vehicle is not shown except for a partial showing of a vehicle hood 24 and front fascia 26 to illustrate the locations of the frame means 10 in relationship to the hood 24 and front end fascia 26 of the vehicle.

Referring to FIG. 1 of the drawings, the vehicle front end support structure or frame 10 comprises, in general, a main frame member 30 and a cross brace 32 which is welded to the main frame member 30. The main frame member 30 comprises a one piece metal tubular member which is bent or shaped to the generally U-shaped configuration shown in FIG. 1. The main frame member 30 comprises a pair of horizontally spaced, but generally vertically disposed, first and second stepped legs 34 and 36 and an intermediate bight or bight portion 38. The bight portion 38 is flattened so as to be planar and abuttingly engages a planar side 20a of the lower tie bar 20. The bight portion 38 is secured to the lower tie bar 20 via bolts 40.

The legs 34 and 36 are integral with the bight portion at their lower ends and are tubular throughout their length except for upper and intermediate flattened sections or areas 42, 43 and 44, 45, respectively. The intermediate flattened sections 43 and 45 of the legs 34 and 36, respectively, are of an inverted L-shape so as to have horizontally disposed leg portions 43a and 45a and vertically disposed leg portions 43b and 45b. The upper flattened sections 42 and 44 of the legs 34 and 36 are also of an inverted L-shape to define horizontally disposed leg portion 42a and 44a and vertically disposed leg portions 42b and 44b, respectively. The horizontally disposed leg portions 42a and 44a comprise the upper free ends of the legs 34 and 36 and overlie the upper tie bar 18. These ends 42a and 44a are suitably secured to the upper tie bar 18 via bolts 50.

The cross piece 32 is a one piece metal tubular member having flattened ends 32a and 32b and an intermediate flattened section 32c. The ends 32a and 32b of the cross member 32 are suitably welded or otherwise secured to the horizontally disposed leg portions 43a and 45a of the intermediate flattened sections 43 and 45 of the legs 34 and 36, respectively. The intermediate flattened sections 32c of the cross brace 32 is planar and generally vertically disposed.

Preferably, the frame or support structure 10 is made from tubular steel material. In addition, the tubular construction with the flattened areas and the smooth transition between the tubular to the flattened areas of the frame 10 provides for a very sturdy and strong frame. Moreover, by welding the ends of the cross brace 32 to the legs 34 and 36 at or adjacent the juncture of the horizontal and vertical leg portions 43a, 45a and 43b, 45b of the intermediate sections 43 and 45, respectively, enables the frame 10 to withstand heavy downward or vertical loading.

The cross brace 32 supports the hood latch assembly 16. The hood latch assembly 16 could be of any suitable or convention construction which is adapted to receive a striker 60 mounted on the underside of the hood for the purpose of latching the hood 24 in place. Suffice it to say that the hood latch assembly 16 would include a housing 62 having transverse flanges 63 which are bolted onto the intermediate section 32c of the cross brace 32 via bolts 64. It should be noted that the hood latch assembly 16 when bolted to the cross brace 32 is disposed so as to lie in or substantially within the same plane as the lower tubular portions of the legs 34 and 36 of the frame 10. Due to the tubular construction of the legs 34 and 36 and the manner in which they are shaped, a very sturdy and strong support for transmitting any downward loading imparted to the hood latch assembly 16 during closing movement of the hood 24 is provided.

The legs 34 and 36 support the headlamp assemblies 12 and 14. The headlamp assemblies 12 and 14 could be of any suitable or conventional construction. Suffice it to say that each of the headlamp assemblies 12 and 14 would include an outer housing 70 having a laterally extending flange 71 which is adapted to overlie the downwardly extending leg portions 43b and 45b of the flattened sections 43 and 45 of the legs 34 and 36, respectively, and be bolted thereto via a pair of spaced vertical bolts 75. It will thus be seen that the headlamp assemblies 12 and 14 extend laterally outwardly of the frame 10 and are supported by the legs 34 and 36 thereof in cantilever fashion.

From the foregoing, it should be apparent that a novel front end structure or frame has been provided for supporting the headlamp assemblies and hood latch assembly located at the front end of a vehicle. It should also be apparent that the support structure or frame 10 can be readily attached to the upper tie bar 18 and the lower tie bar 20 of the vehicle. It should be further apparent that by virtue of the steel tubular structure and the shape to which it is bent, as shown in FIG. 1, that a very strong, sturdy support frame is provided. Additionally, it should be noted that the support frame 10, since it comprises only two welded together pieces, is of a simple and economical construction and does not require a multiplicity of parts to provide the frame work needed to support both the headlamp assemblies and the hood latch assembly.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. A vehicle front end support structure for supporting first and second headlamp assemblies and a hood latch assembly and which is adapted to be secured to both an upper and lower tie bar of a vehicle frame means comprising:
   a generally U-shaped tubular one piece metal support frame member defining first and second generally vertically disposed legs and a lower intermediate bight portion, said first and second legs at their upper ends being generally horizontally disposed and being adapted to be secured to the upper tie bar of the vehicle frame means and said bight portion being adapted to be secured to the lower tie bar of the vehicle frame means, said first and second headlamp assemblies being respectively secured to said first and second legs of said support frame member and extending laterally outwardly therefrom, a one piece tubular cross brace secured to said first and second legs of said support frame member and extending cross wise therebetween, a hood latch assembly secured to said cross brace intermediate its ends, said support frame structure providing the sole support for said first and second headlamp assemblies and said hood latch assembly.

2. A vehicle front end support structure, as defined in claim 1, and wherein said first and second legs of said tubular support frame have flattened free end sections to enable the same to abut against and be readily attached to the upper tie bar and wherein said bight portion is flattened to enable it to abut against and be readily attached to the lower tie bar.

3. A vehicle front end support structure, as defined in claim 2, and wherein said first and second legs intermediate their upper and lower ends have a flattened intermediate section which abuts against a planar flange on said headlamp assembly to enable the latter to be readily attached thereto.

4. A vehicle front end support structure, as defined in claim 3, and wherein said cross brace has its opposite ends flattened and welded to the flattened intermediate sections of the legs of said support frame member.

5. A vehicle front end support structure, as defined in claim 4, and wherein said flattened intermediate sections on said legs are of an inverted L-shape, one leg of the L-shape section being disposed generally horizontally and onto which the ends of the cross brace is welded and the other legs of which is disposed generally vertical to which the headlamp assembly flange is bolted.

6. A vehicle front end support structure for supporting fist and second headlamp assemblies and a hood latch assembly and which is adapted to be secured to both an upper and lower tie bar of a vehicle frame means comprising:
   a generally U-shaped tubular one piece metal support frame member defining first and second stepped generally vertically disposed legs and a lower intermediate bight portion, said first and second legs having upper ends which are flattened and of an inverted L-shape to define both horizontally disposed and vertically disposed leg portions and with the horizontal leg portions overlying and secured to said upper tie bar of the vehicle frame means and said bight portion being flattened and secured to the lower tie bar of the vehicle frame means, said legs also having flattened intermediate sections which are of an inverted L-shape to define horizontally disposed and vertically disposed leg portions, said first and second headlamp assemblies being respectively secured to said vertically disposed leg portions of said intermediate sections of said first and second legs of said support frame member and extending laterally outwardly therefrom, a one piece tubular cross brace secured to said horizontally disposed leg portions of said intermediate sections of said first and second legs of said support frame member and extending cross wise therebetween, a hood latch assembly secured to said cross brace intermediate its ends, said support frame structure providing the sole support for said first and second headlamp assemblies and said hood latch assembly.

7. A vehicle front end support structure, as defined in claim 6, and wherein said cross brace has flattened ends welded to said horizontally disposed leg portions of said intermediate sections of said legs and has a flattened mid-section to which the hood latch assembly is secured and which lies in substantially the same plane as said vertically disposed leg portions of said intermediate section of said legs.

* * * * *